United States Patent [19]

Uchimura et al.

[11] 4,339,807

[45] Jul. 13, 1982

[54] POSTAL CHARGE PROCESSING SYSTEM INCLUDING A WEIGHT MEASURING UNIT, POSTAL CHARGE CALCULATING UNIT AND A METER STAMP ISSUING UNIT

[75] Inventors: Mitsuo Uchimura, Numazu; Masao Oana; Yoshiharu Nishimura, both of Mishima, all of Japan

[73] Assignee: Tokyo Electric Co., Ltd., Tokyo, Japan

[21] Appl. No.: 124,610

[22] Filed: Feb. 25, 1980

[30] Foreign Application Priority Data

Mar. 7, 1979 [JP] Japan .................................. 54/26461
Mar. 7, 1979 [JP] Japan .................................. 54/26464

[51] Int. Cl.³ ...................... G06F 15/20; G01G 23/22
[52] U.S. Cl. .................................. 364/900; 364/466; 177/25
[58] Field of Search ... 364/200 MS File, 900 MS File, 364/466, 567; 177/25

[56] References Cited

U.S. PATENT DOCUMENTS

| | | | |
|---|---|---|---|
| 3,951,221 | 4/1976 | Rock | 177/25 X |
| 4,024,380 | 5/1977 | Gunn | 177/5 X |
| 4,036,316 | 7/1977 | Rock | 177/25 X |
| 4,135,662 | 1/1979 | Dlugos | 364/900 X |
| 4,139,070 | 2/1979 | Hanson et al. | 364/567 X |
| 4,139,892 | 2/1979 | Gudea et al. | 364/466 X |

*Primary Examiner*—Raulfe B. Zache
*Attorney, Agent, or Firm*—Frishauf, Holtz, Goodman and Woodward

[57] ABSTRACT

A postal charge processing system, which comprises a postal charge calculator for calculating the postal charge of a postal parcel from weight data corresponding to the weight of said postal parcel and post condition data concerning post conditions for the postal parcel including the way of mail and region of destination. A memory, numeral keys which are operated when writing a desired fee data in said memory, a clear key for clearing the data in the memory, a meter stanp issue key operated when issuing a meter stamp corresponding to the data in the memory and a meter stamp issuing unit including a data processing unit for controlling the memory in accordance with the operative state of the afore-said various keys, is provided. The data processing unit is set to a clear key lock state at the time when a predetermined bit of charge data calculated by the calculator is transferred therefrom to the memory, and in this state it nullifies key-in data produced with the operation of the clear key.

6 Claims, 29 Drawing Figures

FIG. 7

| JOB PROGRAM | | | | | | | |
|---|---|---|---|---|---|---|---|
| BASIC FEE FOR AIR MAIL | | | | | | | CHARGE FOR S.D. |
| R1 | R2 | R3 | R4 | R5 | R6 | R7 | |
| BASIC FEE FOR AIR MAIL | | | | | | | CHARGE FOR AOD |
| R8 | R9 | R10 | R11 | R12 | R13 | R14 | |
| SURCHARGE FOR AIR MAIL | | | | | | | |
| R1 | R2 | R3 | R4 | R5 | R6 | R7 | |
| SURCHARGE FOR AIR MAIL | | | | | | | |
| R8 | R9 | R10 | R11 | R12 | R13 | R14 | |
| HALF THE BASIC FEE FOR SEA MAIL | | | | | | | CHARGE FOR PRICE INDICATION |
| R1 | R2 | R3 | R4 | R5 | R6 | R7 | |
| HALF THE BASIC FEE FOR SEA MAIL | | | | | | | R15 |
| R8 | R9 | R10 | R11 | R12 | R13 | R14 | |
| HALF THE SURCHARGE FOR SEA MAIL | | | | | | | ADDITIONAL CHARGE FOR PRICE INDICATION |
| R1 | R2 | R3 | R4 | R5 | R6 | R7 | |
| HALF THE SURCHARGE FOR SEA MAIL | | | | | | | R15 |
| R8 | R9 | R10 | R11 | R12 | R13 | R14 | |

FIG. 8

| Y \ X | 0 4321 | 1 4321 | 2 4321 | 3 4321 | 4 4321 | 5 4321 | 6 4321 | 7 4321 | 8 4321 | 9 4321 | A 4321 | B 4321 | C 4321 | D 4321 | E 4321 | F 4321 |
|---|---|---|---|---|---|---|---|---|---|---|---|---|---|---|---|---|
| 2 | | | | | | | | | | | | | | | | |
| 3 | | RSR | | | ACCUMULATION | | CR1 | CR2 | CR3 | REGISTER | | | | | | |
| 4 | | | | KEY | BUFFER | | REGISTER | | | | | | | | | |
| 5 | | | | OPERATION | | | REGISTER | | | | | | | | | |
| 6 | DCR | | | DAR | | | | | DWR | | | | | FR | | |
| 7 | | | | IPR | | | | | DPR | | | | FM1 | FM2 | | |
| 8 | | ASR | | | | ABFR | | | | SSR | | | | | SBFR | |
| 9 | | ACR | | | | | | | MSPR | | | | RWR | | | TCR |
| A | | | | | | | | | | | | WR3 | | | | |
| B | WR1 | | | | | WR2 | | | | WCR1 | | | | | | |
| C | ZWR | | | | WTDR | | | | | | WCR4 | | | | | |
| D | | | | WCR3 | | | | | WCR7 | | | | | WCR5 | WCR2 | |
| E | | WCR6 | | | | | | | | | | | WCR8 | | | |
| F | | | | | | | | | | | | | | | | |

| Y | 2 | | | |
|---|---|---|---|---|
| X | 4 | 3 | 2 | 1 |
| 3 | (AIR) FLAG | (SEA) FLAG | (SD) FLAG | (AOD) FLAG |

FIG. 10

| Y | 3 | | | |
|---|---|---|---|---|
| X | 4 | 3 | 2 | 1 |
| 3 | (AC) FLAG | (PI) FLAG | (KEY) FLAG | |

FIG. 11

| Y | 4 | | | |
|---|---|---|---|---|
| X | 4 | 3 | 2 | 1 |
| 3 | (AMD) FLAG | (SMD) FLAG | (MSI) FLAG | (SIL) FLAG |

FIG. 12

| Y | 5 | | | |
|---|---|---|---|---|
| X | 4 | 3 | 2 | 1 |
| 3 | | (WB1) FLAG | (WB2) FLAG | (ZW) FLAG |

FIG. 13

| Y | 9 | | | |
|---|---|---|---|---|
| X | 4 | 3 | 2 | 1 |
| 3 | (NKO) FLAG | (CKL) FLAG | (CD) FLAG | (EG) FLAG |

FIG. 14

| Y / X | A | | | |
|---|---|---|---|---|
| | 4 | 3 | 2 | 1 |
| 3 | (MD) FLAG | (ED) FLAG | (ACD) FLAG | (AODD) FLAG |

FIG. 15

| Y / X | B | | | |
|---|---|---|---|---|
| | 4 | 3 | 2 | 1 |
| 3 | (AG) FLAG | (COM) FLAG | (OW) FLAG | (DT) FLAG |

FIG. 16

| Y / X | E | | | |
|---|---|---|---|---|
| | 4 | 3 | 2 | 1 |
| 3 | (AFSI) FLAG | (AODSI) FLAG | (SDSI) FLAG | (PISI) FLAG |

FIG. 17

| Y / X | F | | | |
|---|---|---|---|---|
| | 4 | 3 | 2 | 1 |
| 3 | (SDDL) FLAG | (PIDL) FLAG | (PICDL) FLAG | (ADL) FLAG |

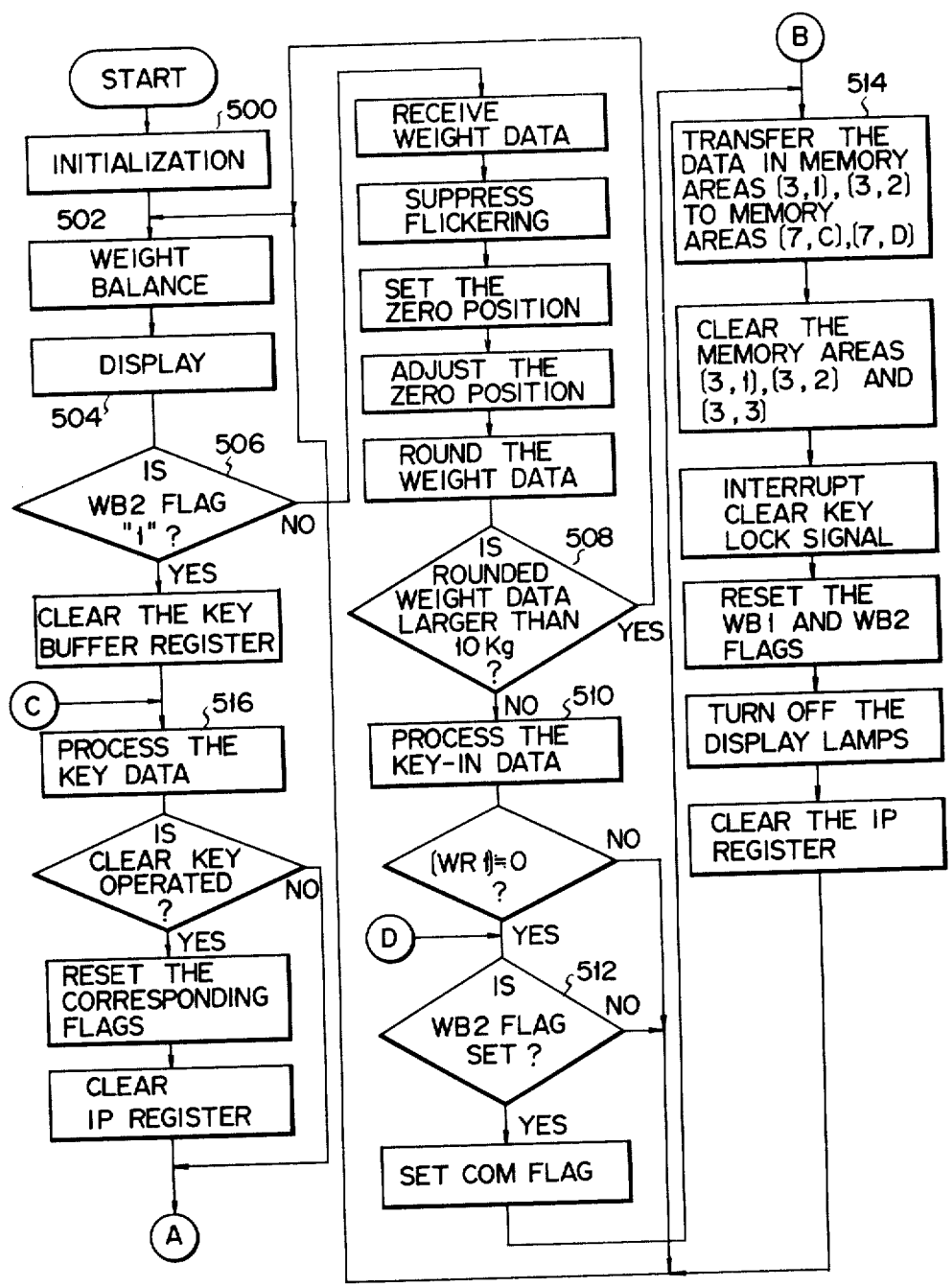
F I G. 18

POSTAL CHARGE PROCESSING SYSTEM INCLUDING A WEIGHT MEASURING UNIT, POSTAL CHARGE CALCULATING UNIT AND A METER STAMP ISSUING UNIT

BACKGROUND OF THE INVENTION

This invention relates to a postal charge processing system, which can issue a meter stamp corresponding to the postal charge data calculated on the basis of the weight and postal conditions of a postal parcel.

Hitherto, there has been known a postal charge processing system, which includes a weight measuring unit for measuring the weight of a postal article such as postal parcel and producing weight data corresponding to the weight of the postal article, a postal charge calculating unit for calculating the postal charge for the postal article on the basis of the weight data from the measuring unit and also selectively set postal conditions including the way of mail such as air mail or sea mail and region of mailing destination, and a meter stamp issuing unit for issuing a meter stamp corresponding to the postal charge data from the postal charge calculating unit. The meter stamp issuing unit is provided with a keyboard so that a desired meter stamp may be issued by appropriately operating the keyboard. This sort of postal charge processing system is operated by two operators, one operating the measuring unit and postal charge calculating unit and the other operating the meter stamp issuing unit.

With this sytem, it is liable that the operator in charge of the meter stamp issuing unit operates a clear key for clearing the postal charge data which has been transferred from the postal charge calculating unit and stored in the meter stamp issuing unit without knowing the fact that the postal charge data is stored in the meter stamp issuing unit.

SUMMARY OF THE INVENTION

An object of the invention is to provide a postal charge processing system, in which during the presence of the postal charge data transferred from the postal charge calculating unit to the meter stamp issuing unit the meter stamp issuing unit is held in a clear inhibition state, in which the postal charge data stored in the meter stamp issuing unit is prevented from being cleared by mistake.

According to one preferred mode of the invention, there is provided a postal charge processing system, which comprises weight measuring means for measuring the weight of a postal article and producing weight data corresponding to the measured weight; postal charge calculating means including first switching means for selectively setting postal conditions at least including the way of mail and region of mailing destination, postal charge calculating means including first memory means for storing postal condition data produced in accordance with the operation of the first switching means, display means and first data processing means for calculating the postal charge based on the weight data from the weight measuring means and postal condition data stored in the first memory means for displaying the calculated postal charge on the display means; and meter stamp issuing means including second switching means, second memory means for selectively storing charge data produced in accordance with the operation of the second switching means or postal charge data produced from the postal charge calculating means, third switching means operated for clearing the second memory means, printing means, fourth switching means operated to drive the printing means for issuing a meter stamp in accordance with the data in the second memory means and second data processing means adapted to be set to a key lock state to make invalid the operation of the second and third switching means and permit only the data produced in accordance with the operation of the fourth switching means at the time when it is detected that charge data of a predetermined number of digits are transferred from the first data processing means to the second data processing means.

BRIEF DESCRIPTION OF THE DRAWINGS

FIG. 7 is a memory map of a read only memory in the postal charge calculating unit shown in FIG. 1;

FIG. 8 is a memory map of a random access memory in the postal charge calculating unit shown in FIG. 1;

FIGS. 9 to 17 show respective memory areas in the random access memory shown in FIG. 8;

FIGS. 18 to 22 show a flow chart of a job program executed by a central processing unit in the postal charge calculating unit shown in FIG. 1;

DETAILED DESCRIPTION OF THE PREFERRED EMBODIMENT

Figure 1:
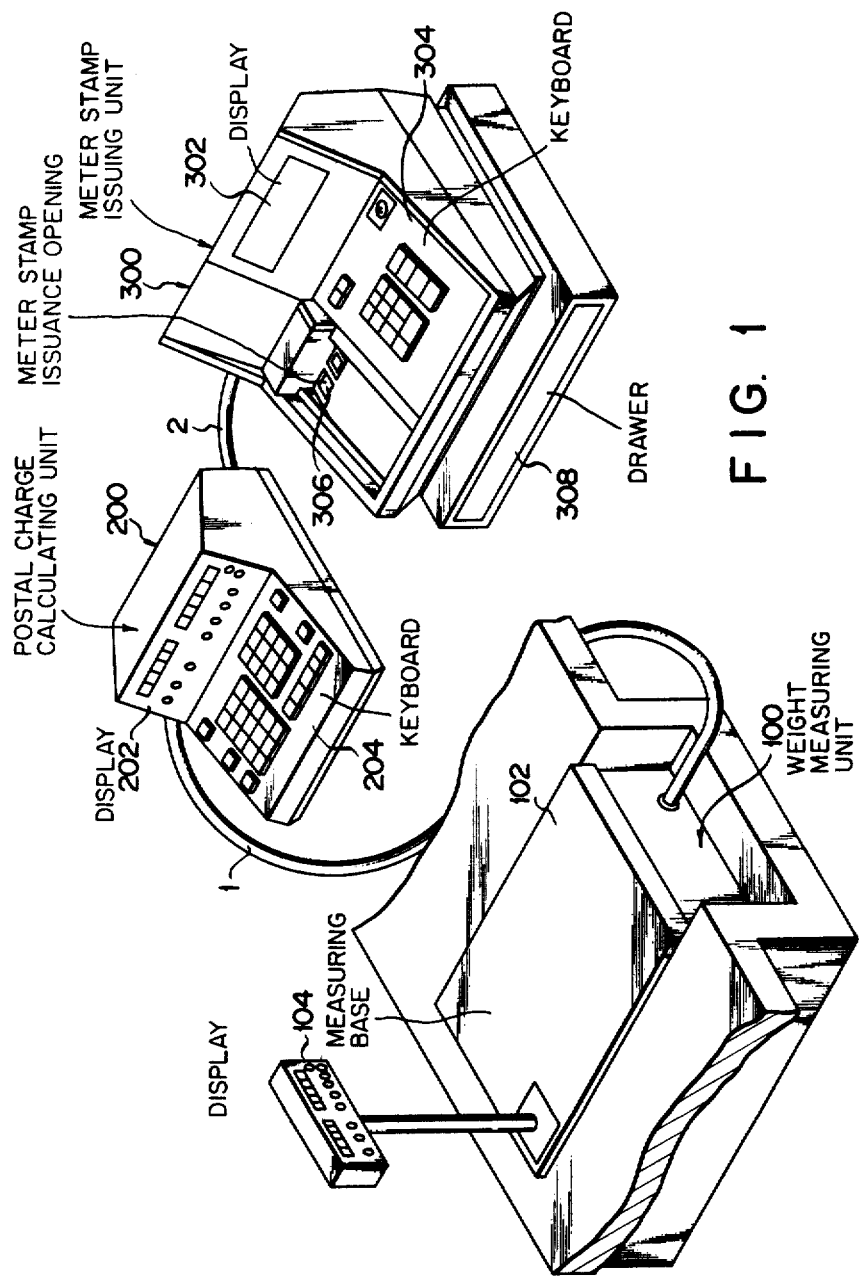
FIG. 1 is a perspective view showing a weight measuring unit, a postal charge calculating unit and a meter stamp issuing unit in one embodiment of the postal charge processing system according to the invention.

FIG. 1 shows a postal charge processing system including a weight measuring unit 100, a postal charge calculating unit 200 electrically coupled to the weight measuring unit 100 via a cable 1 and a meter stamp issuing unit 300 coupled to the postal charge calculating unit 200 via a cable 2. The weight measuring unit 100 includes a measuring base 102 and a display board 104 provided thereon. The postal charge calculating unit 200 includes a display board 202 and a keyboard 204, and the meter stamp issuing unit 300 includes a display board 302, a keyboard 304, a meter stamp issuance opening 306 and a drawer 308.

Figure 2:
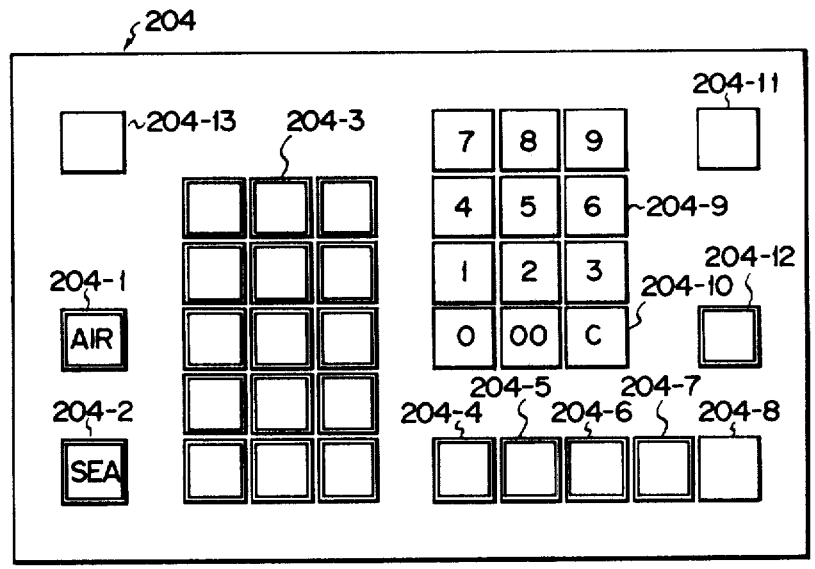
FIGS. 2 and 3 are views respectively showing a keyboard and a display board in the postal charge calculating unit shown in FIG. 1.

FIG. 2 shows the keyboard 204 of the postal charge calculating unit 200. The keyboard 204 has air mail and sea mail keys 204-1 and 204-2 for selecting the way of mail, a plurality of region selection keys 204-3 for selecting the region of destination, an additional charge key 204-4 which is operated when an additional charge is levied on a postal item exceeding a prescribed size, an advice-of-delivery key 204-5 operated when advice of delivery, informing the sender of the fact that the postal item is delivered to the recipient, is requested by the sender, a special delivery key 204-6 operated when special delivery of the postal item is requested, a price indication key 204-7 operated when indication of the compensation price of the content of the postal item is requested and a cancellation key 204-8 for cancelling the postal condition data put in by some of the keys 204-4 to 204-7. The keyboard 204 also has eleven numeral keys 204-9 which represent respective numerals "00", "0" to "9" and are operated to generate data on indicated price of the postal item, a clear key 204-10 operated to clear the price data coupled by the numeral keys 204-9, a zero point adjustment key 204-11 operated to make zero point adjustment of the measuring unit 100 when the zero point is deviated from the initial setting within a range, for instance, from 5 to 300 g, a meter stamp issue key 204-12 operated to transfer the data about the postal charge calculated in the charge calculating unit 200 to the meter stamp issuing unit 300 and a repetition key 204-13 operated when calculating the postal charge of a postal item where the postal transfer conditions such as the way of mail, region of destination, advice of delivery and special delivery are the same as those for the previous postal item. The keys 204-1 to 204-7 and 204-12 are each formed of a self-illumination type key including a transparent box and a lamp (not shown) which is placed in the box to be turned on when the associated box is depressed.

Figure 3:
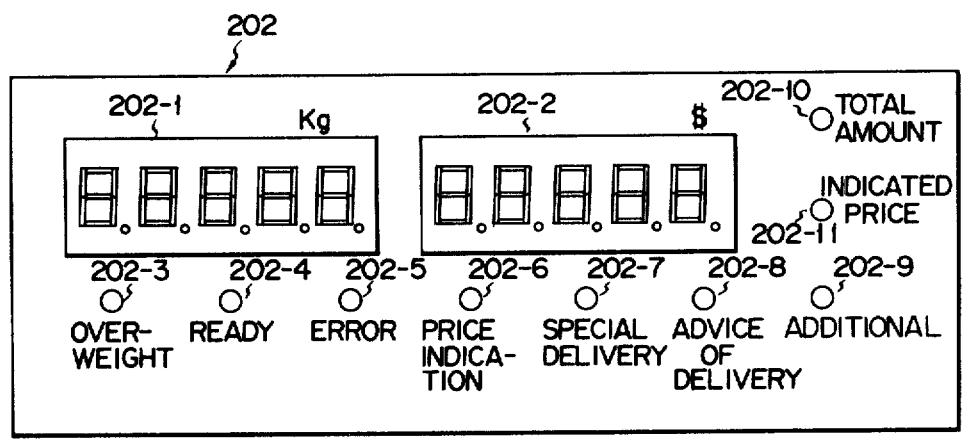

FIG. 3 shows the display board 202 of the charge calculating unit 200. This display board 202 has a five-digit weight display section 202-1 and a five-digit charge display section 202-2. Each digit in these display sections 202-1 and 202-2 is constituted by a total of eight display segments, more particularly seven display elements arranged in the form of a figure eight to display numerical figures and a decimal point display element to display a decimal point. The display board 202 is also provided with an overweight display lamp 202-3, a measurement ready display lamp 202-4, an error display lamp 202-5, a price indication display lamp 202-6, a special delivery display lamp 202-7, an advice-of-delivery display lamp 202-8, a surcharge display lamp 202-9, a total amount display lamp 202-10 and an indicated price display lamp 202-11. The display board 104 of the weight measuring unit 100 has the same construction as the display board 202 of the charge calculating unit 200, so that its description is omitted.

Figure 4:
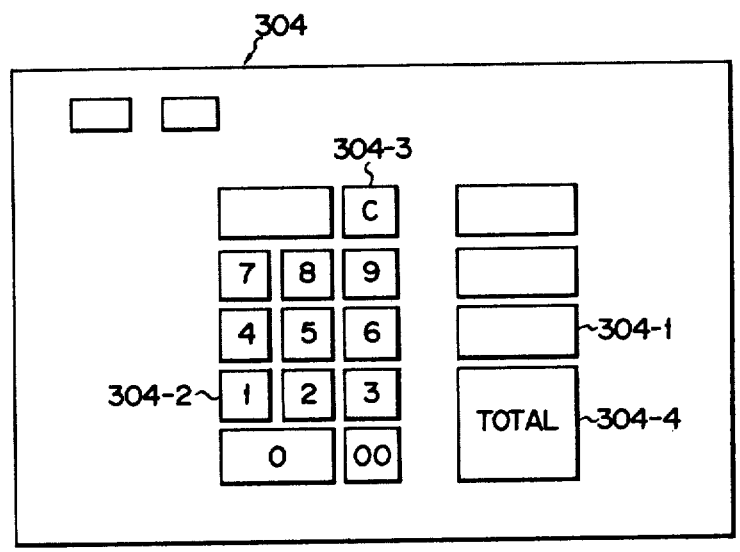
FIGS. 4 and 5 are views showing a keyboard and a display board in the meter stamp issuing unit shown in FIG. 1.

FIG. 4 shows the keyboard 304 of the meter stamp issuing unit 300. This keyboard 304 has a meter stamp issue key 304-1 operated when issuing a meter stamp, eleven numeral keys 304-2 operated to generate data concerning the amount of received money, a clear key 304-3 for clearing the entered money amount data and a total key 304-4 operated when deriving the change from the indicated price on the issued meter stamp and the received amount of money.

Figure 5:
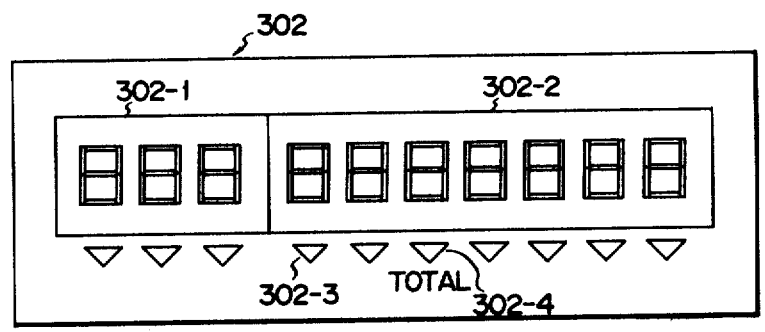

FIG. 5 shows the display board 302 of the meter stamp issuing unit 300. This display board 302 has a three-digit display section 302-1 for displaying the number of copies of the meter stamp to be issued and a seven-digit price display section 302-2 for displaying the price indicated on the meter stamp issued. It is also provided with a meter stamp issuance display lamp 302-3 and a total amount display lamp 302-4 for indicating the operating state of the meter stamp issuing unit 300.

Figure 6:
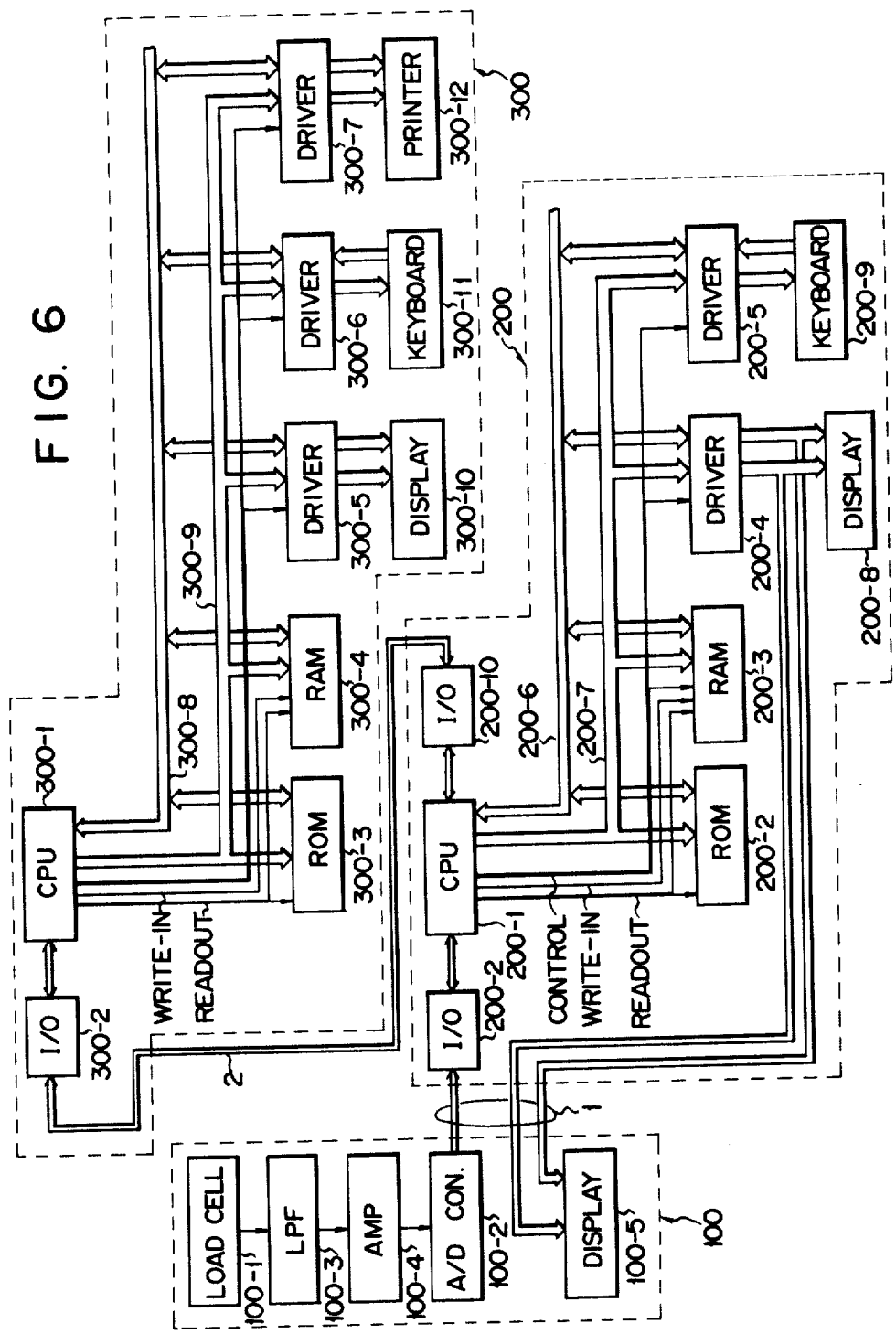
FIG. 6 is a block diagram of the postal charge processing system shown in FIG. 1.

FIG. 6 shows a block diagram representing the circuitry of the weight measuring unit 100, postal charge calculating unit 200 and meter stamp issuing unit 300. The weight measuring unit 100 includes a load cell 100-1 for producing an analog signal corresponding to the weight of a postal parcel put on the measuring base 102 (shown in FIG. 1) and an analog-digital (A/D) converter 100-2 for receiving the analog signal from the load cell 100-1 through a low-pass filter 100-3 and an amplifier 100-4 and converting the input analog signal into a corresponding digital signal. The A/D converter 100-2 supplies a pulse signal at a pulse repetition rate corresponding to the weight of the postal parcel on the measuring base 102 to the postal charge calculating unit 200. The measuring unit 100 further includes a display circuit 100-5 which belongs to the display board 104 shown in FIG. 1.

The postal charge calculating unit 200 includes an input/output (I/O) unit 200-2 and a central processing unit (CPU) 200-1 receiving the pulse signal from the A/D converter 100-2 through the I/O unit 200-2. It also includes a read only memory (ROM) 200-2, a random access memory (RAM) 200-3, a display driver 200-4 and a keyboard driver 200-5, these memories and drivers being coupled to the CPU 200-1 via a data bus 200-6 and an address bus 200-7. It further includes a display circuit 200-8, which belongs to the display board 202 shown in FIG. 3 and is coupled to the display driver 200-4 for the display of data transferred from the CPU 200-1 to the display driver 200-5 via the data bus 200-6. The display circuit 100-5 in the weight measuring unit 100 is also coupled to the display driver 200-4 so that it receives the same data as supplied to the display circuit 200-8. The postal charge calculating unit 200 further includes a keyboard circuit 200-9, which belongs to the keyboard 204 shown in FIG. 2 and is coupled to the keyboard driver 200-5, and key-in data, that is, data generated through keying operation in the keyboard 204 are transferred through the keyboard driver 200-5 to the CPU 200-1. The CPU 200-1 is coupled through another I/O unit 200-10 and the cable 2 to the meter stamp issuing unit 300.

The meter stamp issuing unit 300 includes an I/O unit 300-2 and a CPU 300-1 receiving data from the postal charge calculating unit 200 through the I/O unit 300-2. It also includes a ROM 300-3, a RAM 300-4, a display driver 300-5, a keyboard driver 300-6 and a printer driver 300-7, these memories and drivers being coupled to the CPU 300-1 via a data bus 300-8 and an address bus 300-9. It further includes a display circuit 300-10, which belongs to the display board 302 shown in FIG. 5 and is coupled to the display driver 300-5 for the display of data transferred from the CPU 300-1 to the display driver 300-5 via the data bus 300-8. The meter stamp issuing unit 300 further includes a keyboard circuit 300-11, which belongs to the keyboard 304 shown in FIG. 4 and is coupled to the keyboard driver 300-6, and key-in data generated by key operations in the keyboard 304 are transferred through the keyboard driver 300-6 to the CPU 300-1. The unit 300 further includes a printer circuit 300-12, which is coupled to the printer driver 300-7 for executing printing operation according to data transferred from the CPU 300-1 through the printer driver 300-7.

FIG. 7 shows the memory map of the ROM 200-2 in the postal charge calculating unit 200. As is shown, the ROM 200-2 has a job program memory area 220-1 in which a job program to be executed by the CPU 200-1 in response to the operation of the keyboard 204 and in conformity to the flow charts shown in FIGS. 18 to 28 is stored, a basic fee data memory area 220-2 in which data concerning basic fees for air mail of postal items of weights below a first predetermined weight and destined to first to fourteenth destination regions R1 to R14 are stored, a surcharge data memory area 220-3 in which data concerning surcharges for air mail levied due to overweight on postal item exceeding the first predetermined weight and destined to the first to fourteenth destination regions R1 to R14 are stored, a half the basic fee data memory area 220-4 in which data concerning one half the basic fees for sea mail of postal items of weights below a second predetermined weight and destined to first to fifteenth destination regions R1 to R15 are stored, and a half the surcharge data memory area 220-5 in which data concerning one half the surcharges for sea mail levied due to overweight on postal item exceeding the second predetermined weight and destined to the first to fifteenth destination regions are stored. The ROM 200-2 further includes a special delivery charge data memory area 220-6 in which data concerning special delivery charges for special delivery postal item are stored, an advice-of-delivery charge data memory area 220-7 in which data concerning charges for advice-of-delivery are stored, a price indication charge data memory area 220-8 in which data concerning charges for indication of compensation price of the content of postal item are stored, and an additional charge data memory area 220-9 in which data concerning additional charges levied when indication of price higher than a predetermined compensation price is requested are stored.

FIG. 8 shows the memory map of the RAM 200-3 in the postal charge calculating unit 200. As is shown, the RAM 200-3 has 256 word memory areas individually having four bit positions and specified by combinations of 14-bit X-direction address data and 14-bit Y-direction address data transferred from the CPU 200-1. The memory areas of addresses [2, 0] to [2, F], that is, with X-address of [2] and Y-addresses of [0] to [F], constitute an ACCUMULATION register for storing addition result of the basic postal fee and the special charge, the memory area of address [3, 1] constitutes a region selection register (RSR) for storing the selected destination region data, the memory areas of addresses [3, 6], [3, 7] and [3, 8] constitute respective first to third count registers CR1 to CR3 for storing the number of measured weight data of the same value, the memory areas of addreses [4, 0] to [4, F] constitute a KEY BUFFER register for temporarily storing key-in data, the memory areas of addresses [5, 0] to [5, F] constitute an OPERATION register for storing intermediate results of operation at the time of data processing, the memory area of address [6, 0] constitutes a digit count register (DCR), the memory areas of addresses [6, 1] to [6, 5] constitute a display amount register (DAR), the memory areas of addreses [6, 6] to [6, A] constitute a display weight register (DWR), and the memory areas of addresses [6, B] to [6, F] constitute a fee register (FR). The memory areas of addresses [7, 0] to [7, 6] constitute an indicated price register (IPR), the memory areas of addresses [7, 7] to [7, 9] constitute a decimal point register (DPR), the memory areas of addresses [7, C] and [7, D] constitute respectively first and second function memories (FM1 and FM2), the memory areas of addresses [8, 0] to [8, 3] constitute a surcharge register (ASR) for storing data concerning surcharge levied for air mail, due to overweight, the memory areas of addresses [8, 4] to [8, 7] constitute a basic fee register (ABFR) for storing basic fee data for air mail, the memory areas of addresses [8, 8] to [8, B] constitute a surcharge register (SSR) for storing data of half the surcharge levied for sea mail due to overweight, the memory areas of addresses [8, C] to [8, F] constitute a basic fee register (SBFR) for storing data of half the basic fee for sea mail, the memory areas of addresses [9, 0] to [9, 4] constitute an additional charge register (ACR), the memory areas of addresses [9, 6] to [9, A] constitute a meter stamp price register (MSPR), the memory areas of addresses [9, E] and [9, F] constitute a time counting register (TCR), the memory areas of addresses [B, 9] to [B, E] constitute a rounded weight register (RWR), the memory areas of addresses [B, F] to [C, 0] constitute a first weight register (WR1), the memory areas of addresses [C, 4] to [C, 8] and those of addresses [C, 9] to [C, D] respectively constitute second and third weight registers (WR2 and WR3), the memory areas of addresses [C, E], [C, F] and [D, 0] to [0, 2] constitute a zero weight register (ZWR), the memory areas of addresses [D, 3] to [D, 7] constitute a weight truth data register (WTDR), the memory areas of addresses [D, 8] to [D, C], [E, 2] to [E, 6], [E, 7] to [E, B], [F, 1] to [F, 5], [F, 6] to [F, A] and [F, B] to [F, F] respectively constitute first, third, fourth, sixth, seventh and eighth weight count registers (WCR1, WCR3, WCR4, WCR7 and WCR8), the memory areas of addresses [D, D], [D, F], [E, 0] and [E, 1] constitute a second weight count register (WCR2), and the memory areas of addreses [E, C] to [E, F] and [F, 0] constitute a fifth weight count register (WCR5). The memory area of address [3, 2] stores flag data about advice of delivery (AOD), special delivery (SD), sea mail (SEA) and air mail (AIR) in the first to fourth bit positions as shown in FIG. 9. The memory area of address [3, 3] stores flag data about key operation (KEY), price indication (PI) and surcharge (AC) in the second to fourth bit positions as shown in FIG. 10. The memory area of address [3, 4] stores flag data about the on-off state of all self-illumination type lamps (SIL), that of the self-illumination type lamp for meter stamp issuance display (MSI), that of the self-illumination type lamp for sea mail display (SMD) and that of the self-illumination type lamp for air mail display (AMD) in the respective first to fourth bit positions as shown in FIG. 11. The memory area of address [3, 5] stores flag data about zero weight (ZW), second weight balance (WB2) and first weight balance (WB1) in the respective first to third bit positions as shown in FIG. 12. The memory area of address [3, 9] stores flag data about error generation (EG), count display state (CD), clear key lock state (CKL) and numeral key operation (NKO) in the first to fourth bit positions as shown in FIG. 13. The memory area of address [3, A] stores flag data about the on-off state of the advice-of-delivery display lamp (AODD), that of the surcharge display lamp (ACD), that of the error display lamp (ED) and that of the measurement ready display lamp (MD) in the first to fourth bit positions as shown in FIG. 14. The memory area of address [3, B] stores flag data about data transmission (DT), overweight (OW), operation of counting the number of measurements (COM) and alarm generation (AG) in the first to fourth bit positions as shown in FIG. 15. The memory area of address [3, E] stores flag data about the on-off state of the price indication display self-illumination type lamp (PISI), that of the special delivery display self-illumination type lamp (SDSI), that of the advice-of-delivery display self-illumination type lamp (AODSI) and that of the additional fee display self-illumination type lamp (AFSI) in the respective first to fourth bit position as shown in FIG. 16. The memory area of address [3, F] stores flag data about the display state of the amount display lamp (ADL), that of the price indication charge display lamp (PICDL), that of the price indication display lamp (PIDL) and that of the special delivery display lamp in the respective first to fourth bit positions as shown in FIG. 17.

In the postal charge calculating unit 200, the ROM 200-2, RAM 200-3, display driver 200-4 and keyboard driver 200-5 are controlled according to the keying operation in the keyboard 204 on the basis of the job program stored in the ROM 200-2 as shown by the flow chart in FIGS. 18 to 23.

Figure 23:
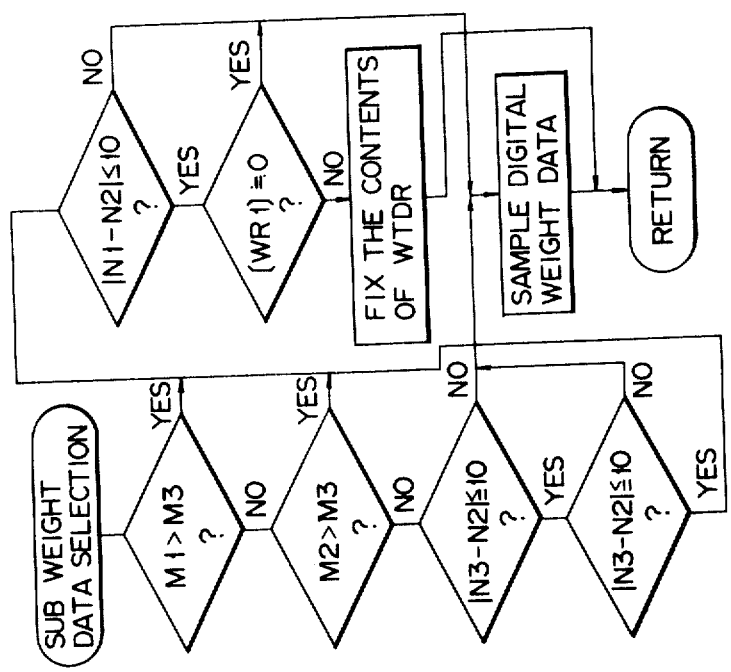
FIG. 23 shows a flow chart for a subroutine for weight data selection.

When the postal charge processing system shown in FIG. 1 is coupled to a power source (not shown), a state ready for the post charge processing is established in an initialization step 500 shown in FIG. 18. In this initialization step 500, selection of weight data, suppression of flickering, automatic zero adjustment, zero setting, rounding of the weight data and extinguishing of display lamps are executed like the prior-art postal charge processing system of this sort. In the execution of the weight data selection, digital weight data representing the number of pulses corresponding to the weight of the load and generated from the weight measuring unit 100, is written into the first weight data register WR1 at a predetermined sampling rate, and the contents of the register WR1 are progressively shifted from the first to the eighth weight count registers WCR1 to WCR8 and written therein. Then, the number of those data among the digital data stored in the second to eighth weight count registers WCR2 to WCR8 which have the same value as that stored in the first weight count register WCR1 is counted, and the count data M1 indicating the number of the digital data of the same value is written in the first count register CR1. Similarly, the number of those data among the digital data stored in the third to eighth weight count registers WCR3 to WCR8 which have the same value as that stored in the second weight count register WCR2 is detected, and the count data M2 indicating the number of the digital data having the same value is written in the second count register CR2. Also, the number of those data among the digital data stored in the fourth to eighth weight count registers WCR4 to WCR8 which have the same value as that stored in the third weight count register WCR3 is detected, and the count data M3 indicating the number of the digital data having the same value is written in the third count register CR3. It is assumed that the digital weight data stored in the first to third weight count registers WCR1 to WCR3 are respectively represented by N1, N2 and N3 pulses. In this case, if M1>M3 and |N1-N2|≦10 or M1≦M3<M2 and |N1-N2|≦10 or M1, M2≦M3 and |W1-N3|≦10, as shown in FIG. 23, and the content [WR1] of the first weight data register WR1 does not represent 0g, the count data of the greatest value among the count data M1, M2 and M3 is stored in the third weight data register WR3 and weight truth data register WTDR, and also the first weight balance (WB1) flag is set. Also, if five or more weight data of the same value other than a value representing 0g are detected, the corresponding count data is stored not in the third weight data register WR3 but in the second weight data register WR2, while the WB1 flag is set. When the WB1 flag is set in this way, the data shift operation with respect to the first to eighth weight count registers WCR1 to WCR8 is stopped. Further, if the aforementioned condition regarding the weight data is not satisfied, the weight data from the measuring unit 100 is repeatedly and progressively stored in the first to eighth weight count registers WCR1 to WCR8.

The weight data that is stored in the weight truth data register WTDR in the above way is one which represents the number of pulses. This weight data is rounded or converted into one directly corresponding to the weight such that, for instance, 10 pulses represent 5 grams. The rounded weight data thus obtained is stored in the rounded weight register RWR.

The suppression of flickering is executed in such a manner that the data in the weight truth data register WTDR is kept unchanged irrespective of a change of the data in the third weight data register WR3 within a predetermined range before the weight data is fixed in the weight truth data register WTDR.

The automatic setting of zero position is executed when the prevailing indication substantially corresponding to 0 g is deviated from the initially set zero position within a range of, for intance, ±8 pulses in case where 5 grams is represented by 10 pulses; at this time the prevailing substantially corresponding to 0 g indication is automatically adjusted to the initially set zero position. In order to initially set such zero position, the CPU 200-1 reads out zero position digital data representing, for example, 2200 count pulses and writes the same into the zero weight registor ZWR in the initialization step 500.

The extinguishing of display lamps is executed by storing a display invalid data or "F" data in each memory area in the display amount register DAR and display weight register DWR. As a result, the individual digit display lamps in the weight display section 202-1 and charge display section 202-2 are turned off.

Further in the initialization step 500 all the display lamps are extinguished and checked if they can operate properly, and also the individual data display sections are checked by supplying signals representing numbers "0" to "9" to all the digits of the data display sections. Further, the content of the KEY BUFFER register is cleared to bring an end to the initialization step 500, so that the system is now ready for the postal charge processing operation.

When the ready state is thus established, whether or not to receive key-in data produced by keying operation in the keyboard 204 is determined in accordance with the weight of the postal item placed on the measuring base 102 at this moment. More particularly, in the weight balance step 502 whether or not the second weight balance (WB2) flag is set in the second bit position of the memory area of address [3, 5] is checked and, if it is not set, the weight display section 202-1 (FIG. 3) is turned off, as shown in detail in FIG. 24. Next, whether or not the first weight balance (WB1) flag is set in the third bit position in the memory area [3, 5] is checked and, if it is set, it is checked to see if the content of the rounded weight register RWR has a value greater than a predetermined weight value, for instance 15 kg. If the content of the register RWR has a value greater than 15 kg, the alarm generation (AG) flag is set in the fourth bit position in the memory area of address [3, C]

the overweight display (OW) flag is set in the second bit position of this memory area, the overweight display lamp 202-3 is turned on, and reception of key-in data provided by keying operation in the keyboard 204 is inhibited.

If the data in the register RWR has a value less than 15 kg, the data in the rounded weight register RWR is transferred to the display weight register DWR. Next, if the data in the register RWR has a valUe greater than a predetermined weight value, for instance 10 kg, the same process as in the case of a value greater than 15 kg as mentioned above is executed. If the data in the register RWR has a value less than 10 kg, the overweight display lamp 202-3 is turned off, and then it is checked if the zero weight (ZW) flag is set in the first bit position of the memory area of address [3, 5]. If the ZW flag is set, that is, it is detected that no load is placed on the measuring base 102 the measurement ready display lamp 202-4 is turned on, and the reception of key-in data is permitted. If the ZW flag is not set, the measurement ready display lamp 202-4 is turned off, and then whether or not the data of the register RWR has a value less than 30 g is checked. If the weight data has a value less than 30 g, the reception of key-in data is permitted. If the weight data has a value greater than 30 g, the WB2 flag is set, and then the reception of key-in data is permitted. The WB2 flag is set when the weight data has a value between 30 g and 10 kg. Also even in case if neither of the WB1 and WB2 flags is set or if the WB2 flag is set, the reception of key-in data is permitted.

It is to be understood that in the weight balance step, if the weight data in the register RWR has a value between 30 g and 10 kg, the WB2 flag is set and the reception of the key-in data is permitted. In a case where the weight data has a value representing a weight less than 30 g, the reception of key-in data is permitted only when the ZW flag is set. Further, if the weight data has a value greater than 10 kg, the overweight display lamp 202-3 is turned on, and the reception of key-in data is inhibited. The WB1 flag is set when the weight data in the weight truth data register WTDR is fixed after the weight measurement is started as mentioned earlier.

Figure 25:
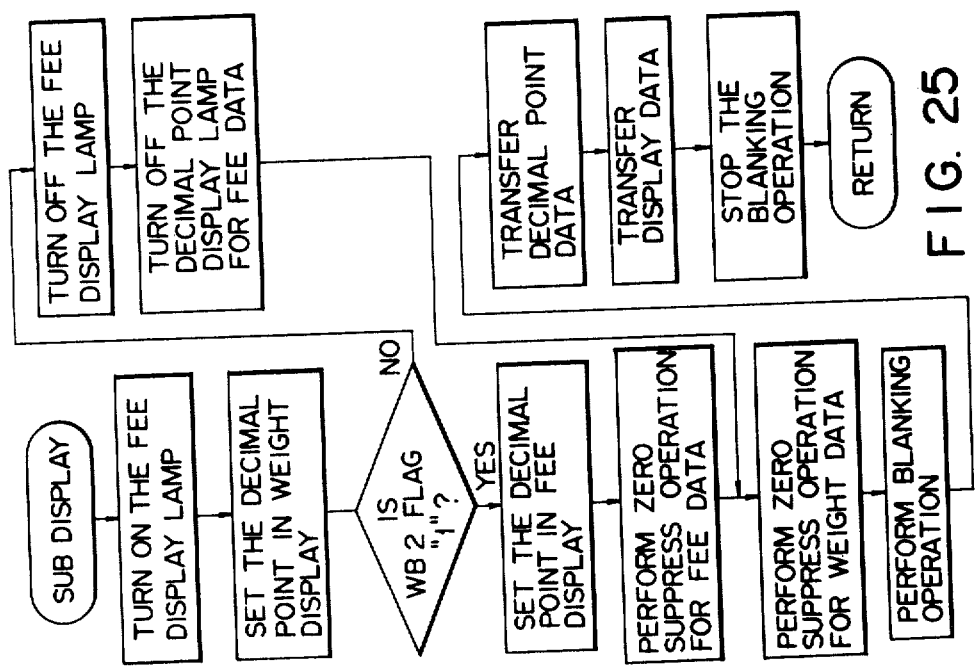
FIG. 25 shows a flow chart for a subroutine for display.
Figure 24:
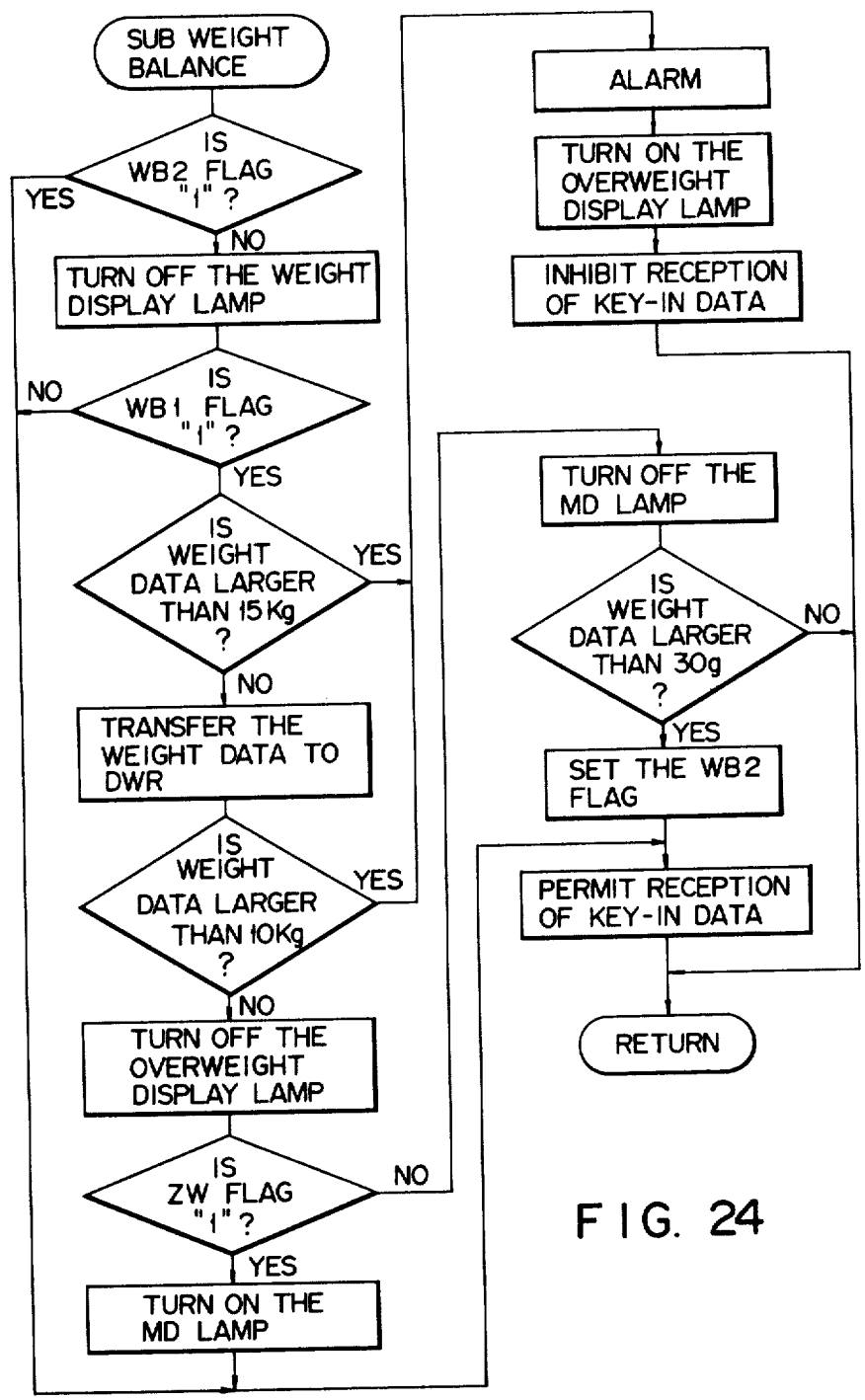
FIG. 24 shows a flow chart for a subroutine for weight balance.
Figure 26:
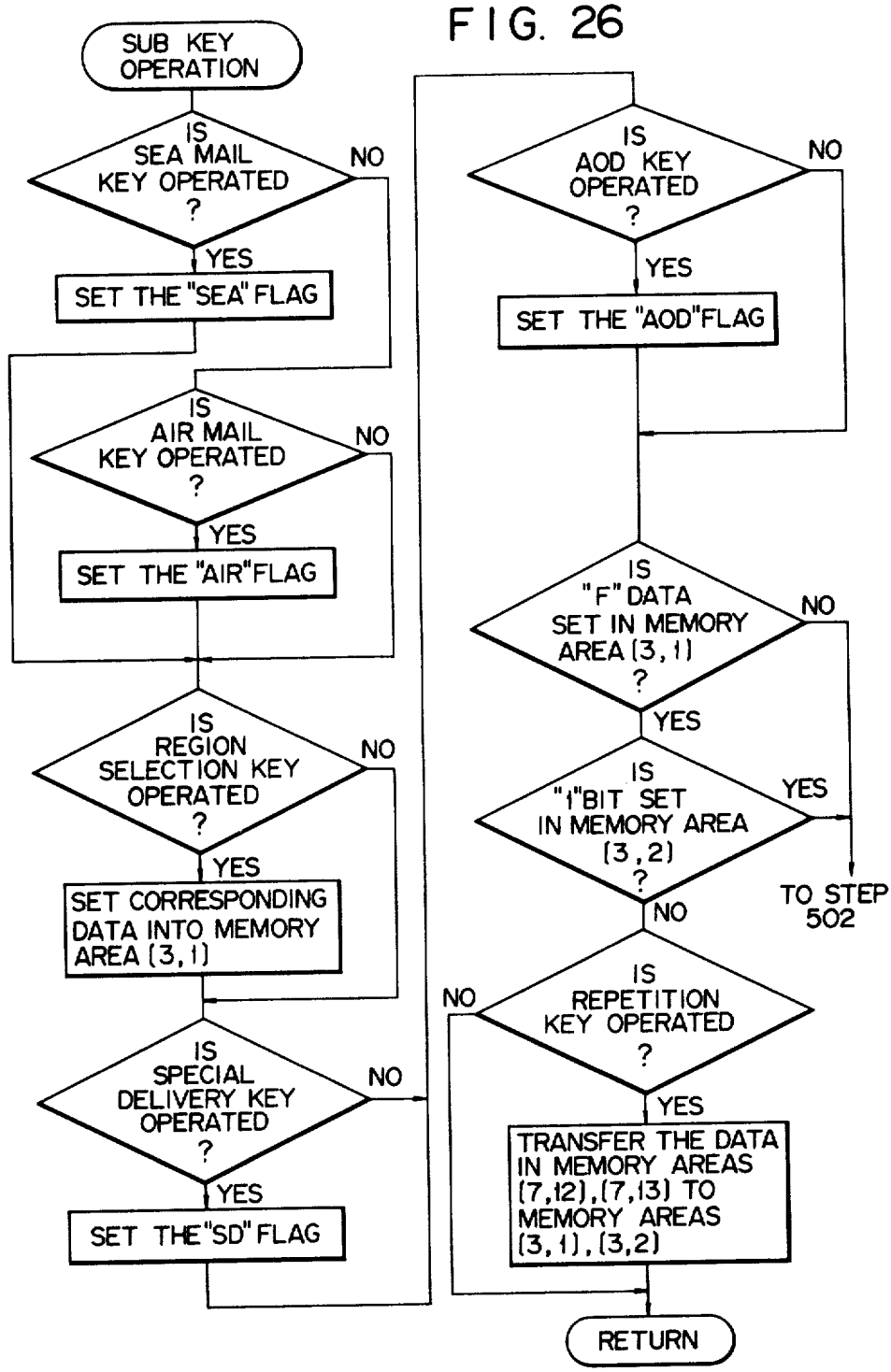
FIG. 26 shows a flow chart for a subroutine for key operation.

When the weight balance step 502 is ended, a display step 504 is executed. As shown in FIG. 25, in the display step 504 the fee display lamp 202-10 is first turned on, and then the decimal point position in the weight display section 202-1 is set. Next, it is checked if the second weight balance (WB2) flag is set. If the WB2 flag is set, that is, if the weight of the postal parcel is detected to be within a range between 30 g and 10 kg, the decimal point position in the fee display section 202-2 is set, and at the same time zero suppression with respect to the fee data is executed. If the WB2 flag is not set, the fee display section 202-2 is deenergized, and also the decimal point display lamp in the fee display section 202-2 is also turned off. Subsequently, zero suppression with respect to the weight data, blanking, transfer of the decimal point data and fee display data to the display section 202 and releasing of blanking are executed in the mentioned order. This means that in the display data processing step 504 the weight data is transferred from the rounded weight register RWR to the display section 202, and if the WB2 flag is set the fee data is also transferred from the fee register FR to the display section 202.

In the next step 506, whether or not the WB2 flag is set is checked. If the WB2 flag is not "1", that is, if the weight of the postal parcel is detected to be out of a range, for instance, between 30 g and 10 kg, selection of true weight data, suppression of flickering, automatic adjustment of zero position and key-setting of zero position are executed, and the received weight data is rounded in the manner as described before. The key-setting of the zero position is executed by operating the zero adjustment key 204-11 when the zero position is deviated beyond a range capable of automatic zero position adjustment and in a range between, for example, 5 and 300 g. In a step 508, whether or not the rounded weight data has a value greater than 10 kg is checked. If the rounded weight data represents a weight greater than 10 kg, the weight balance step 502 is executed again. If the rounded weight data represents a value less than 10 kg, the key-in data is processed in a step 510, as shown in detail in FIG. 26. In this step 510, whether or not the sea mail key 204-2 is operated is checked first. If the operation of the sea mail key 204-2 is detected, data "1" and "0" are respectively written in the third and fourth bit positions in each of the memory areas of addresses [3, 2] and [3, 4]. As a result, the self-illumination type lamp (not shown) for the key 204-2 is turned on. If the key 204-2 is not operated, whether or not the air mail key 204-1 is operated is checked. If the operation of the key 204-1 is detected, data "0" and "1" are respectively written in the third and fourth bit positions in each of the memory areas of addresses [3, 2] and [3, 4]. As a result, a self-illumination type lamp (not shown) for the key 204-1 is turned on. In a case where data "1" is written in the third or fourth bit position in the memory area of address [3, 2] or if neither the air mail key 204-1 nor the sea mail key 204-2 is opeated it is checked if any region selection key 204-3 is operated. If one of the region selection keys 204-3 is operated, data corresponding to the operated region selection key is written in the region selected register RSR of address [3, 1], and the corresponding self-illumination type lamp is turned on. Next, whether or not the special delivery key 204-1 is operated is checked. If it is operated, data "1" is written in the second bit position in the memory areas of addresses [3, 2] and [3, E] and in the fourth bit position in the memory area of address [3, F]. As a result, the self-illumination type lamp for the key 204-6 and the special delivery display lamp 202-7 are turned on. Then, it is checked if the advice-of-delivery key 204-5 is operated. If the operation of the key 204-5 is detected, data "1" is written in the first bit position in the memory areas of addresses [3, 2] and [3, A] and the third bit position in the memory area of address [3, E], and the self-illumination type lamp for the key 204-5 and advice-of-delivery display lamp 202-8 are turned on.

If none of the region selection keys 204-3 is operated, "F" data, that is, data [1, 1, 1, 1], is written in the region selection register RSR. IF "F" data stored in the region selection register RSR or data "1" is written in any bit position in the memory area of address [3, 2], the weight balance step 502 is executed again. If "F" data is stored in the region selection register RSR and data "0" is stored in each bit position in the memory area of address [3, 2], the reception of the key-in data of the repetition key 204-13 is permitted. When the repetition key 204-13 is operated under the above condition, the data stored in the first and second function memory areas FM1 and FM2 are transferred to the respective memory areas of addresses [3, 1] and [3, 2].

When the step 510 is ended in this way, it is checked if the content [WR1] of the weight register WR1 has a value corresponding to 0 g or representing count pulses of 2200±559. If it is detected that the content of the weight data register WR1 corresponds to 0 g, whether or not the WB2 flag is set is checked in a step 512. If it is not detected that the content of the register WR1 corresponds to 0 g or if the WB2 flag is not set, the weight balance step 502 is executed again. If the setting of the WB2 flag is not detected in the step 512, the COM flag which represents completion of measurement is set in the third bit position in the memory area of address [3, B]. Subsequently, in a step 514 the data in the memory areas of addresses [3, 1] and [3, 2] are transferred to the first and second function memory areas FM1 and FM2, and then the memory areas [3, 1], [3, 2] and [3, 3] are cleared. Further, the clear key lock signal is interrupted, the WB1 and WB2 flags are reset, the display lamps associated with the memory areas [3, 1], [3, 2] and [3, 3] are turned off, and the indicated price register IPR is cleared. Thereafter, the weight balance step 502 is executed again.

Figure 19:
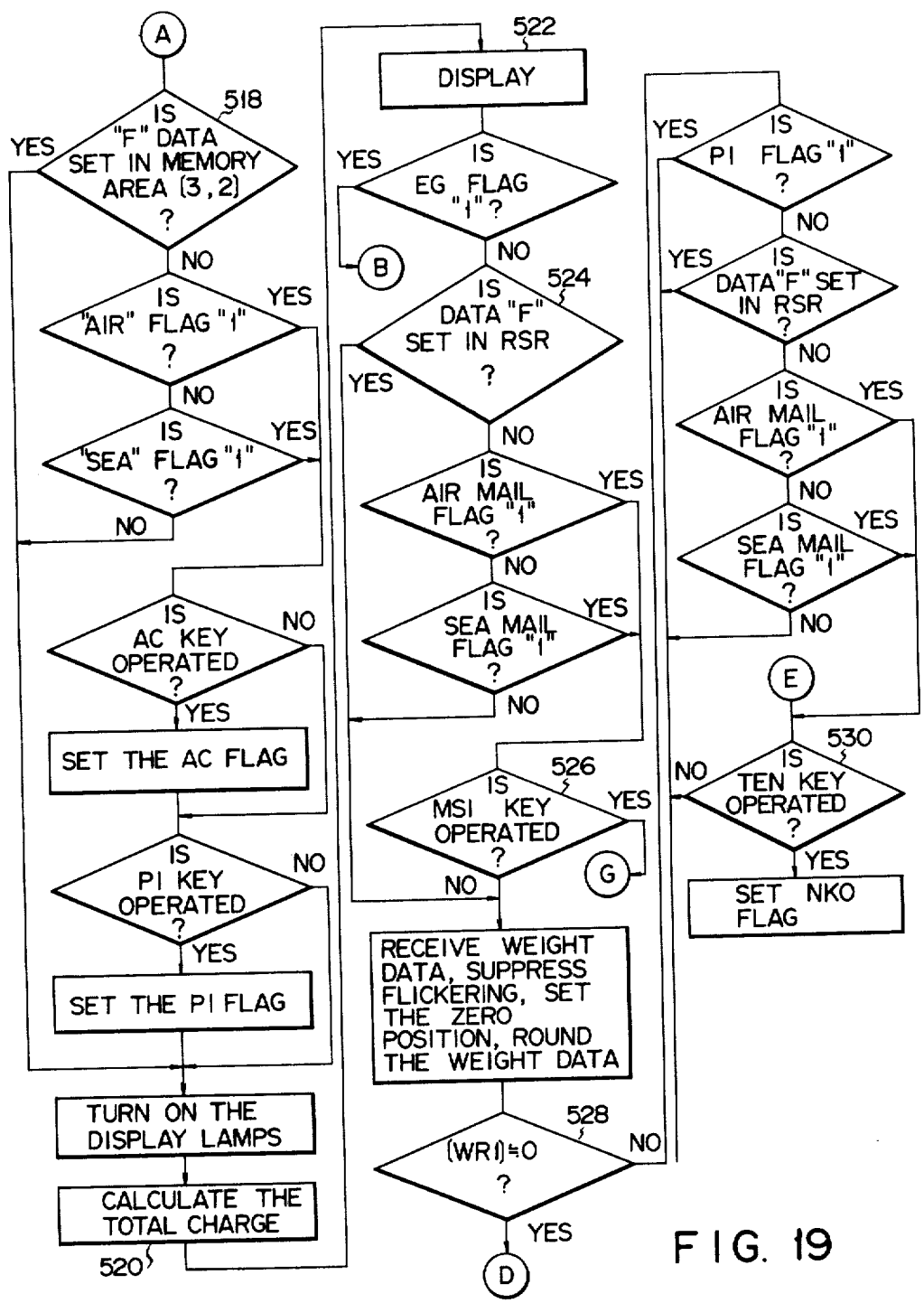

In the meantime, if it is detected in the step 510 that the WB2 flag is set, key-in data processing similar to that in the step 510 as shown in FIG. 19 is executed in a step 516 after the KEY BUFFER register has been cleared. Subsequently, whether or not the clear key 204-8 is operated is checked. If it is detected that the clear key 204-8 is operated, data "0" is written in the third and second bit positions in the memory area [3, 2] and the third and fourth bit positions in the memory area [3, 3], and the indicated price register IPR is cleared.

Thereafter, in a step 518 shown in FIG. 19, whether or not "F" data is written in the memory area [3, 1] is checked. If the "F" data is not detected, whether or not data "1" is written in the fourth and third bit positions in the memory area [3, 2], that is, whether or not the AIR and SEA flags are set, is checked. If the AIR or SEA flag is detected to be set, whether or not the additional charge key 204-4 is operated is then checked. If the key 204-4 is operated, data "1" is written in the fourth bit position in the memory area [3, 3], and then whether or not the price indication key 204-7 is operated is checked. If it is detected that the price indication key 204-7 is operated, data "1" is written in the third bit position in the memory area [3, 3], and then various lamps are turned on according to the data stored in the memory areas [3, 1], [3, 2] and [3, 3]. The turn-on operation of these various lamps is also executed when it is detected in the step 518 that "F" data is set in the memory area [3, 1] or when it is detected after the step 518 that the AIR or SEA flag is set. Subsequently, the total postal charge is calculated in a step 520. As shown in detail in FIG. 27, in the total postal charge calculation step 520, whether or not "F" data is written in the memory area [3, 1] is first checked. If it is detected that "F" data is written in the memory area [3, 1], a display step 522 similar to the display step 504 is executed. If it is detected that no "F" data is written in the memory area [3, 1], data representing one half the basic sea mail fee and one half the sea mail surcharge for the specified destination region are read out from the ROM 200-2 in accordance with the data stored in the memory area [3, 1], that is, the region selection register RSR and respectively written in the basic fee register SBFR and surcharge register SSR. At this time, fee data corresponding to half the basic sea mail fee is also written into the fee register ACR. If the weight data in the rounded weight register RWR representing the weight of the postal parcel has a value greater than a predetermined weight value W1, one half the surcharge for sea mail is added to the fee data in the additional charge register ACR a number of times corresponding to the overweight. In other words, if the aforementioned weight data has a value greater than the predetermined weight value W1, data corresponding to one half the sea mail surcharge due to overweight is added to the fee data in the additional charge register ACR, and the result is written in the additional charge register ACR while at the same time subtracting weight data corresponding to a predetermined unit weight, for instance 1 kg, from the aforementioned rounded weight data. If the result of subtraction of 1 kg, is still greater than the predetermined weight value W1, the data corresponding to one half the sea mail surcharge due to overweight is again added to the fee data in the additional charge register ACR, and the sum of the fee data written in the additional charge register ACR while subtracting data corresponding to 1 kg from the aforementioned result of subtraction. This operation is repeatedly executed until the result of subtraction of 1 kg from the preceding result is zero or negative. When the surcharge due to overweight is determined in this way, the fee data in the additional charge register ACR is doubled and then transferred to the fee register FR. This means that data concerning the sea mail fee is stored in the fee register FR. At this time, whether or not either SEA flag or AIR flag is set is checked. If the AIR flag is set, data corresponding to the basic air mail fee and air mail surcharge for the specified destination region are read out from the ROM 200-2 and respectively written in the air mail basic fee register ABFR and the air mail surcharge register ASR. The basic air mail fee is written, instead of the basic sea mail fee, into fee register FR. If the predetermined weight is exceeded by the postal parcel, data for air mail surcharge stored in the register ASR is added to the fee data in the fee register FR, and the result is written in the fee register FR. Similar to the case of sea mail, this addition is repeated while subtracting data corresponding to a predetermined weight, for instance 500 g, from the previous result of subtraction and the air mail surcharge is added after every subtraction until a result of subtraction represents zero or a negative weight value. In this way, data concerning the air mail fee is stored in the fee register FR when the IR flag is set. When the additional charge key 204-4 is operated in case of either sea mail or air mail, half the sum of the basic fee and surcharge for sea mail, stored in the additional charge register ACR, is added as additional charge data to the fee data in the fee register FR, and the result is written in the fee register FR. Further, when the special delivery key 204-6, advice-of-delivery key 204-5 and price indication key 204-7 are operated, the corresponding fee data is read out from the ROM 200-2 and added to the fee data in the fee register FR, and the result is written in the fee register FR. The data about the charge for price indication may be read out from the ROM 200-2 according to the indication price data. Subsequently, the fee data in the fee register is transferred to the fee display register FDR. At the same time, data "1" is written in the second bit position in the memory area [3, 9], and the same adding operation as described above is executed again. The fee data obtained by the first adding operation is stored in the fee display register FDR, and that obtained by the second adding operation is stored in the fee register FR. If the data in the registers FR and FDR coincide with each other, the first bit position in the memory area [3, 9] is cleared, and the EG flag is reset, indicating that the adding operation is effective. If the data in both the registers FR and FDR do not coincide, and also if no EG flag is set, the second bit position in the memory area [3, 9] is cleared while setting the EG flag, and the fee calculation step is repeated. Further, if the data in both the registers FR and FDR do not coincide while the EG flag is set in the memory area [3, 9], the WB2 flag is reset, that is, the second bit position in the memory area [3, 5] is cleared, and a display step similar to the display step 504 is executed. Subsequently, the error display lamp 202-5 is turned on, and the AG flag is set. The error display lamp 202-5 can be turned off when the clear key 204-10 is operated. At this time, the AG flag is simultaneously reset. Thereafter, a display step 522 similar to the display step 504 is executed. After the end of the display step 522, whether or not the error generation (EG) flag is set is checked. If the EG flag is detected to be set in the total postal charge calculation step 520, a step 514 as shown in FIG. 8 is executed. If the calculation is correctly done so that no ED flag is set, whether "F" data is set in the region selection register RSR is checked in a step 524. If it is detected in the step 524 that no "F" data is set and if the AIR or SEA flag is set, checks as to whether or not the meter stamp issue (MSI) key 204-12 is operated and whether or not the MSI flag is set are executed in a step 526. If it is detected that the MSI key 204-12 is not operated, if it is detected in the step 524 that "F" data is written in the region selection register RSR, or if it is detected after the step 524 that neither AIR nor SEA flag is set, then reception of weight data, suppression of flickering, automatic zero adjustment, zero setting and rounding of weight data are executed in the manner described in connection with the initialization step 500. Subsequently, whether or not the data [WR1] in the first weight data register WR1 corresponds to 0 g is checked. If it is detected that the data [WR1] in the register WR1 has a value corresponding to 0 g, the step 512 shown in FIG. 18 is executed, followed by the same data processing as that mentioned before. If it is detected in the step 528 that the data in the register WR1 has a value corresponding to 0 g or equal to the data in the zero weight register ZWR whether or not the price indication (PI) flag is set is checked. If the PI flag is set, if "F" data is written in the region selection register RSR or if the PI flag, AIR and SEA flags are all reset, then the key-in data processing step 516 shown in FIG. 18 is executed, followed by data processing similar to that mentioned before. If either AIR or SEA flag is set, whether or not numeral keys 204-9 are operated for writing the indicated price data in the indicated price data register IPR is ckecked in a step 530. If it is detected that no numeral key 204-9 is operated, the key-in data processing step 516 shown in FIG. 18 is executed, followed by data processing similar to that mentioned before. Further, it is detected in a step 530 that the numeral keys 204-9 are operated, the NKO flag is set, and also the indicated price data written in the indicated price data register IPR by keying operation is displayed on the display boards 104 and 202. The indicated price can be displayed in, for instance, a total of seven digit positions, namely five digit positions in the fee display section 202-2 in the display board 202 and two lower digit positions in the weight display section 202-1. If it is detected in a step 532 shown in FIG. 20 that the price indication key 204-7 is operated, the PI flag is set, and also after the resetting of the NKO flag the step 516 shown in FIG. 18 is executed again, followed by data processing similar to that mentioned before. If it is detected that the operation of the price indication key 204-7 is not operated, whether or not numeral keys 204-9 are operated is checked. If it is detected that numeral keys 204-9 are operated, the step 530 shown in FIG. 19 is executed. If it is detected that no numeral key 204-9 is operated, whether or not the clear key 204-10 is operated is checked. If it is detected that the clear key 204-10 is operated, the indicated price data that is written by the operation of numeral keys 204-9 is reset, and then the step 590 shown in FIG. 19 is executed. If the clear key 204-10 is not operated, reception of weight data, suppression of flickering, automatic zero adjustment, zero setting and rounding of weight data are executed in the same manner as described earlier in connection with the initialization step 500. Subsequently, whether or not the data in the first weight data register WR1 corresponds to 0 g is checked. If it is detected that the data [WR1] in the register WR1 corresponds to 0 g, the step shown in FIG. 18 is executed. If the data [WR1] in the register WR1 does not correspond to 0 g, the step 532 is executed.

Figures 20, 22:
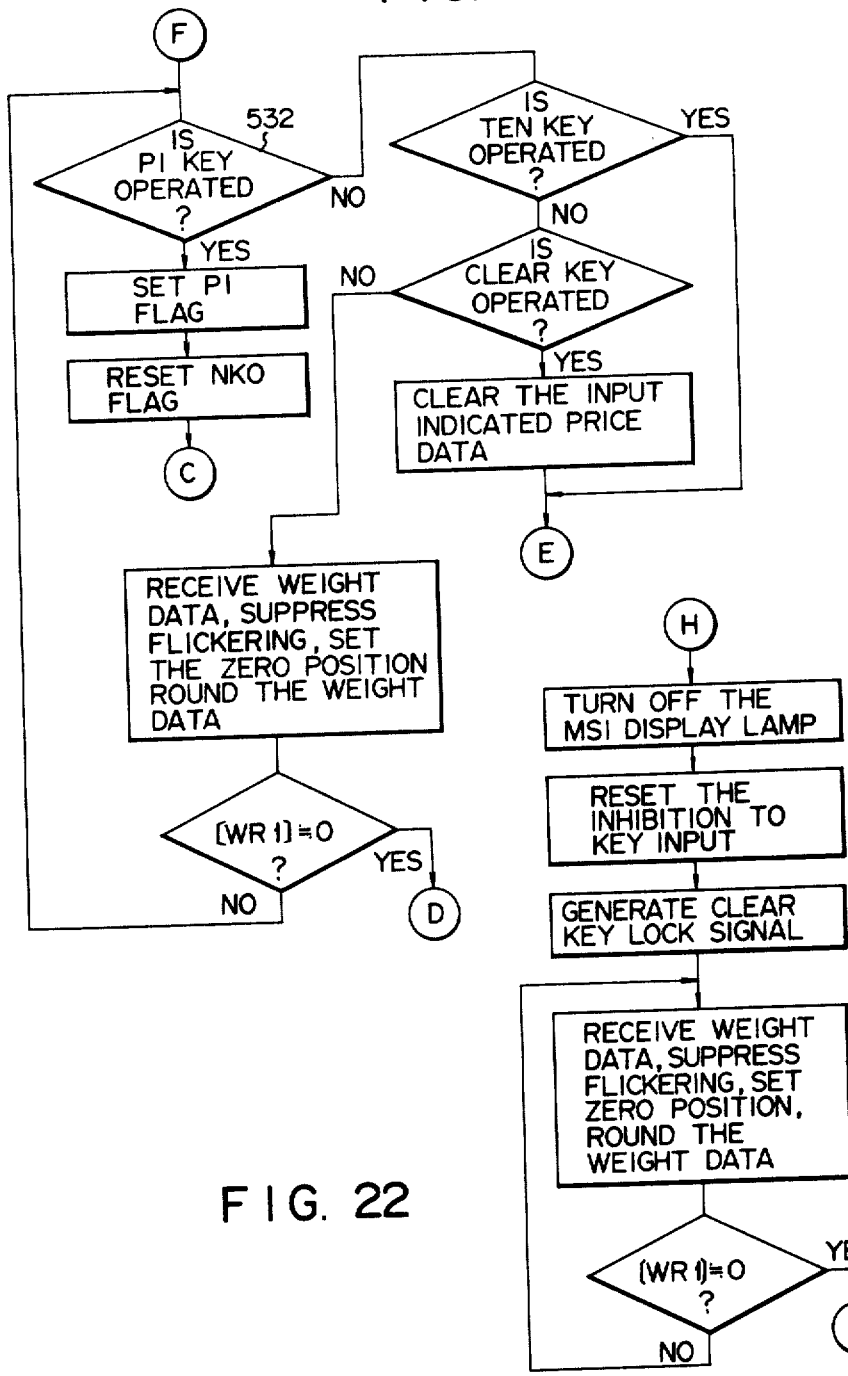
Figure 21:
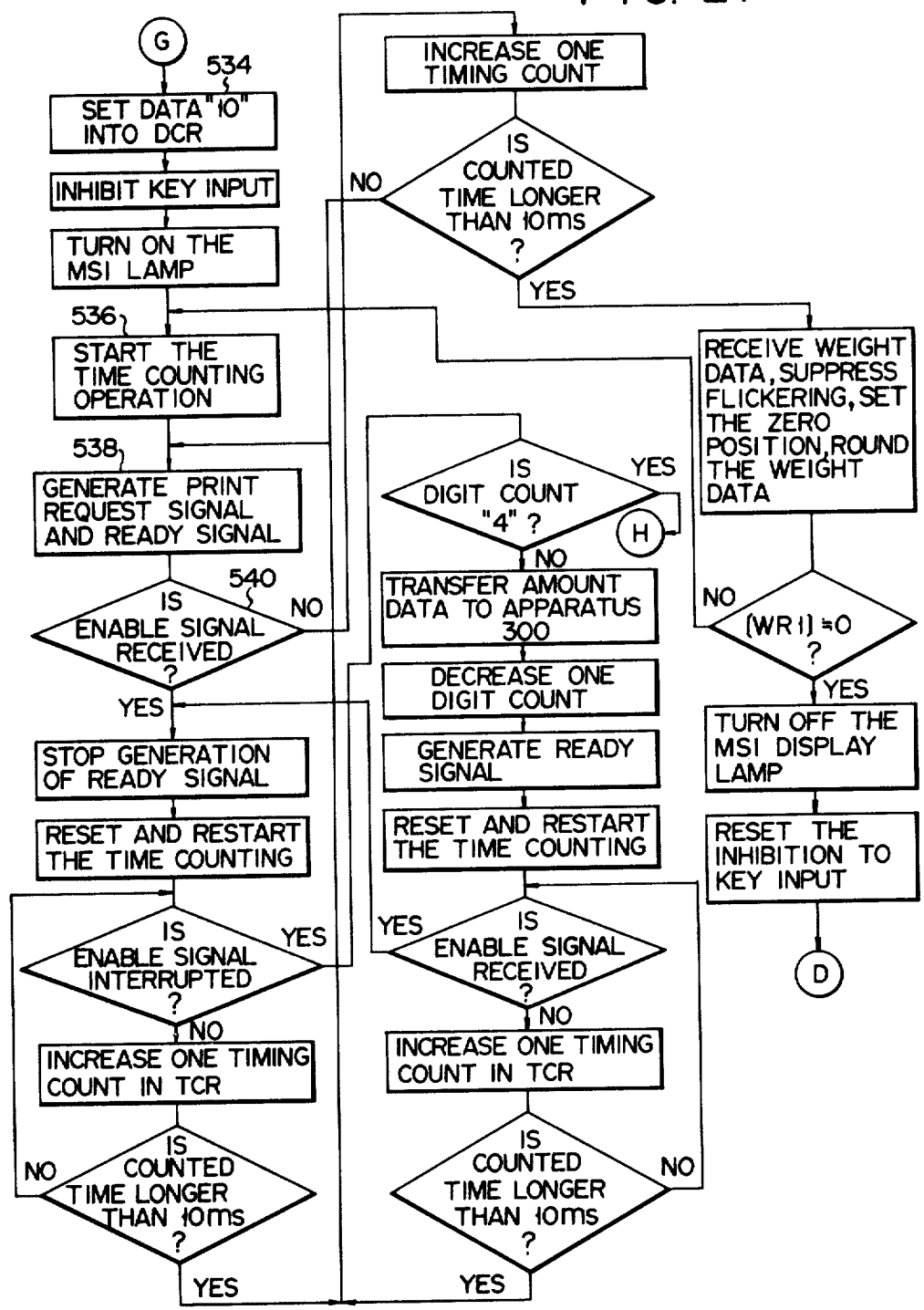

If the total postal charge calculation in the step 520 is correctly executed so that no EG flag is set, key input from the meter stamp issue (MSI) key 204-12 is permitted. If it is detected in the step 526 that the MIS key 204-1 is operated, data "10" is written in the digit count register DCR in a step 534 shown in FIG. 21. Then, the key input is inhibited, data "1" is written in the second bit position in the memory of address [3, 4], that is, the MSI flag is set, and the self-illumination type lamp for the MSI key 204-12 is turned on. Thereafter, the CPU 200-1 starts time counting operation in a step 536, and a print request signal and a ready signal are generated and supplied through the I/O unit 200-10 to the meter stamp issuing unit 300 in a step 538. The CPU 300-1 of the meter stamp issuing unit 300 checks, upon reception of the print request signal and ready signal, whether the unit 300 is set in a ready state for issuing meter stamp or in a busy state. If the unit 300 is not in the busy state, an enable signal is supplied from the unit 300 to the charge calculating unit 200. When the CPU 200-1 in the charge calculating unit 300 receives the enable signal in a step 540 before the lapse of a predetermined response period, for instance 10 msec., it interrupts the ready signal, and resets and then resumes the time counting operation to check whether or not the counted time exceeds 20 msec. Also, it transfers the fee data in the fee display register FDR to the meter stamp issuing unit 300. The transfer of the fee data to the meter stamp issuing unit 300 is executed by repeating the generation and interruption of the ready signal for every digit, and each time a digit of the fee data is transferred, the content of the digit count register is reduced by one count. When the content of the digit count register DCR is reduced from "10" to "4", indicating that all the fee data of 6 digits has been transferred to the meter stamp issuing unit 300, the MSI display lamp is turned off, the key input inhibition is reset, and a clear key lock signal is produced and supplied to the meter stamp issuing unit 300, as shown in FIG. 22. When this state is set up, the charge data transferred to the meter stamp issuing unit 300 is prevented from being cleared even if the clear key 304-3 is operated. In this state, with the removal of the postal parcel from the measuring unit 100, causing the data [WR1] in the first weight data register WR1 to be substantially equal to 0 g, the step 512 shown in FIG.

18 is executed, following by data processing similar to that mentioned before.

Further, if it is detected in the step 540 that no enable signal is received by the postal charge calculating unit 200 due to the busy state of the meter stamp issuing unit 300 and that subsequently 20 msec. has been elapsed, with the removal of the postal parcel from the measuring unit 100 to cause the data in the first weight data register WR1 to correspond to 0 g, the self-illumination type lamp for the MSI key 204-12 is turned off, and after the release of the key input inhibition the step 512 shown in FIG. 18 is executed again, followed by data processing similar to that mentioned before.

Figure 29:
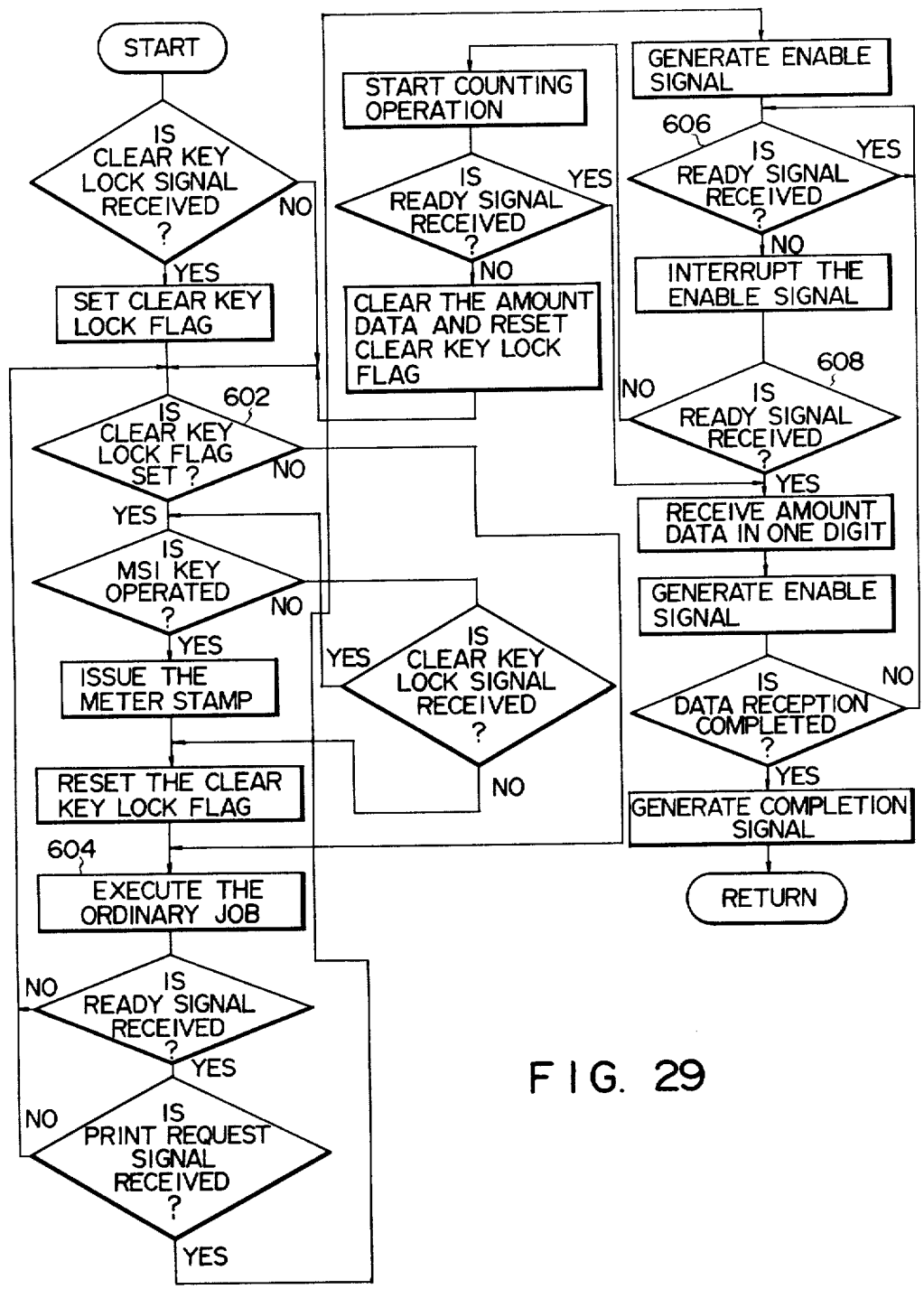
FIG. 29 shows a flow chart corresponding to a program executed by the meter stamp issuing unit shown in FIG. 1.

In the meter stamp issuing unit 300, at an instant when it is detected in a step 602 shown in the flow chart of FIG. 29 that no clear key lock flag is set in a predetermined memory area in the RAM 300-4, the CPU 300-1 processes key-in data produced by keying operation in the keyboard 304 (FIG. 4) in a step 604. For example, when the clear key 304-3 is operated, first and second fee data memory areas allocated in the RAM 300-4 are cleared. When the meter stamp issue (MSI) key 304-1 is operated after operation of numeral keys 304-2, the corresponding fee data is written in the first fee data memory area, while at the same time the display circuit 300-10 and printer circuit 300-12 are driven. In consequence, the charge data is displayed, and also a meter stamp which can serve as a check is issued. When this ordinary job is ended, it is checked it the ready signal and print request signal are produced from the charge calculating system. If it is detected that the ready signal and print request signal are both received, the CPU 300-1 supplies an enable signal to the charge calculating unit 300. Subsequently, if interruption of the ready signal from the charge calculating unit is detected in a step 606, the enable signal from the CUP 300-1 is stopped. If it is detected in a step 608 that the ready signal is received again, one bit portion the charge data at a first digit is read out from the charge calculating unit 200 and written into the second fee data memory area of the RAM 300-4. Then, the enable signal is given again to the charge calculating unit 200 for executing the step 606 again, and this operation is repeatedly carried out until all the charge data is written into the second fee data memory area. Also, if it is detected in a step 608 that no ready signal is received within a predetermined period of time, the charge data that has already been received is cleared, and the clear key lock flag is reset, followed by the execution of the step 602. If it is detected in the step 602 that the clear key lock flag is set, the CPU 300-1 produces a control signal to the keyboard driver 300-6 so that key operation of any key other than the meter stamp issue (MIS) key 304-1 in the meter stamp issuing unit 300 is made invalid. This means that even if the clear key 304-3 is operated, the charge data stored in the charge data memory register is not cleared. Also, even if numeral keys 304-2 are operated, no charge data is written in the first fee data memory area. However, if the MSI key 304-1 is operated at this time, a meter stamp which can serve as a check is issued on the basis of the charge data transferred to the second charge data memory area. The CPU 300-1 stops generation of the control signal to the key board driver 300-6 when the meter stamp is issued or the postal parcel is removed from the weight measuring unit 100. Subsequently, the key lock flag is reset, and again in the step 604 the CPU 300-1 executes the normal job in accordance with the job program stored in the ROM 300-3.

The key lock flag is set by the clear key lock signal which is produced from the CPU 200-1 at the time when the transfer of all charge data stored in the charge data memory area 220-4 to the second fee data memory area of the meter stamp issuing unit 300, and is reset with the interruption of the clear key lock signal. The clear key lock signal is interrupted when the data [WR1] in the first weight data register WR1 comes to have a value corresponding to 0 g, that is, when the postal parcel is removed from the measuring base 102 of the measuring unit 100, or when a meter stamp is issued on the basis of the charge data transferred to the meter stamp issuing unit 300. Thus, when the meter stamp issuing unit 300 is busy so that the transfer of charge data is inhibited from being transferred from the charge calculating unit 200 to the meter stamp issuing unit 300 and then the postal parcel is removed from the measuring base 102 of the measuring unit 100, the clear key lock flag is reset, and at the same time the self-illumination type lamp for the MSI key 204-12 in the charge calculating unit 200 is turned off. It is to be understood that in this embodiment the meter stamp is issued on the basis of the data in the second fee data memory area when the clear key lock flag is set while it is issued on the basis of the data in the first fee data memory area when the clear key lock flag is not set.

As has been shown, when the MSI key 204-12 is operated after the proper execution of charge calculation, the self-illumination type lamp of the MSI key 204-12 is turned on, and the ready signal and print request signal are supplied from the charge calculating unit 200 to the meter stamp issuing unit 300. If the meter stamp issuing unit 300 is not busy at this time, the postal charge data calculated in the charge calculating unit 200 is transferred to the meter stamp issuing unit 300 and is displayed on the display board 302 in the meter stamp issuing unit 300. When the transfer of the postal charge data is completed, the self-illumination type lamp for the MSI key 204-12 in the charge calculating unit 200 is turned off, while the clear key lock signal is generated to the meter stamp issuing unit 300. In response to the clear key clock signal, the meter stamp issuing unit 300 is set to the clear key lock state. Once this state is set, operation of the clear key 304-3 is made invalid, and thus the postal charge data will not be cleared. Thus, it will be appreciated that once the clear key lock state is set, even if the operator in charge of the meter stamp issuing unit 300 operates the clear key 304-3 without knowing the fact that postal charge data has been transferred from the charge calculating unit 200 to the meter stamp issuing unit 300, the charge data transferred to the meter stamp issuing unit 300 will not be cleared. At this time, by operating the MIS key 304-1 a meter stamp is issued on the basis of the charge data that is now stored in the second fee data memory area in the RAM 300-4 in the meter stamp issuing unit 300. With subsequent removal of the postal parcel, the clear key lock signal from the charge calculating unit 200 is interrupted, thus resetting the meter stamp issuing unit 300 from the clear key lock state. The clear lock state of the meter stamp issuing unit 300 is also reset when the postal parcel is removed from the measuring unit 100 before operation of the MIS key 304-1 in a state that the charge data from the charge calculating unit 200 is stored in the second memory area of the RAM 300-4 of the meter stamp issuing unit 300. Therefore, in this case, the charge data stored in the RAM 300-4 is cleared by operating the clear key 304-3.

Figure 27:
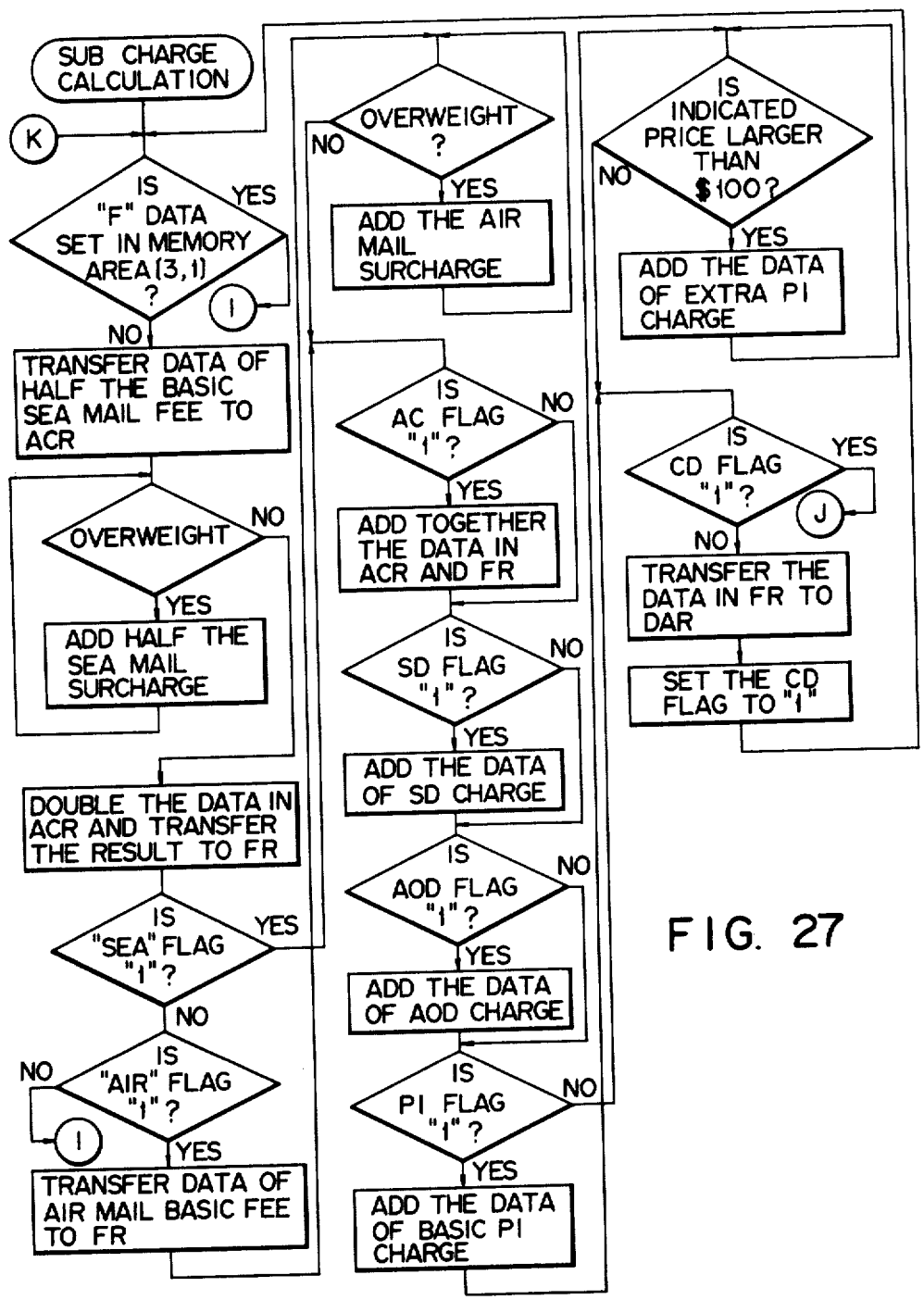
FIGS. 27 and 28 show a flow chart for a subroutine for charge calculation.
Figure 28:
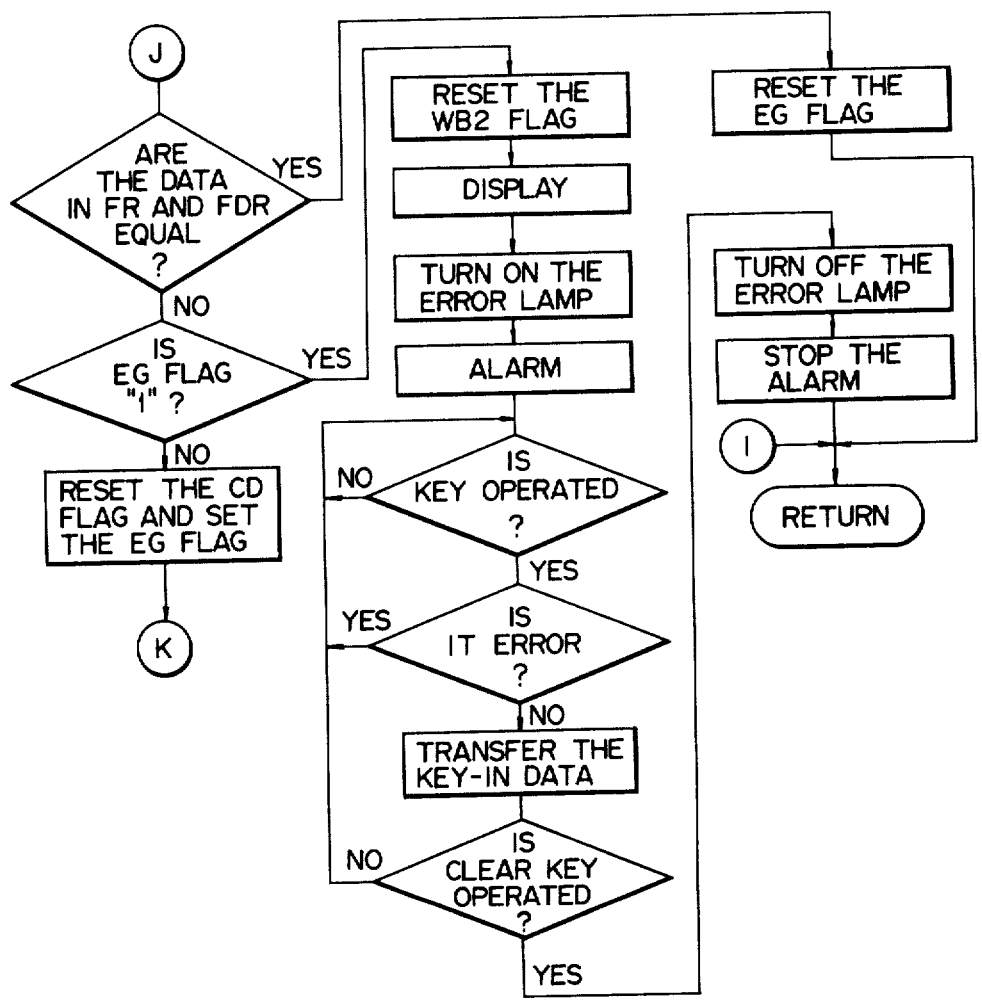

While a preferred embodiment of the invention has been described, it is by no means limitative. For example, while an example of calculation of the surcharge due to overweight of the postal parcel and the additional charge is shown in FIG. 27, it is also possible to use a ROM in order to obtain the charge data without carrying out such charge calculation. In this case, data about surcharges for overweights and additional charges for corresponding weights are stored in the ROM in order to permit readout of given overweight surcharge data and additional charge data from the ROM according to address data corresponding to the overweight and weight of the postal article.

What we claim is:

1. A postal charge processing system comprising: weight measuring means for measuring the weight of a postal article and producing weight data corresponding to the weight of said postal article; charge calculating means coupled to said weight measuring means and including first switching means for selectively setting postal conditions at least including the way of mail and region of mailing destination; first memory means for storing postal condition data produced in accordance with the operation of said first switching means; display means; second switching means; and first data processing means coupled to said weight measuring means, first and second switching means and to said first memory means for calculating the postal charge from the weight data obtained from said weight measuring means and postal condition data stored in said first memory means for displaying the calculated postal charge on said display means, said first data processing unit including means for generating calculated postal charge data in response to the operation of said second switching means; and meter stamp issuing means including third switching means; second memory means for selectively storing charge data produced in response to the operation of said third switching means or charge data produced from said first data processing means; fourth switching means coupled to said second memory means for clearing the data in said second memory means; printing means; fifth switching means; and second data processing means coupled to said first data processing means, second memory means, printing means and to said third through fifth switching means, said second data processing means assuming first and second operative states, wherein said second data processing means includes means for causing when it is in said first operative state, charge data to be written into said second memory means in accordance with the operation of said third switching means, the data in said second memory means to be cleared in response to the operation of said fourth switching means, and a meter stamp corresponding to the data in said second memory means to be issued from said printing means in response to the operation of said fifth switching means, and said second data processing means being set to said second operative state in response to a control signal generated from said first data processing means when charge data calculated in said first data processing means has been transferred to said second memory means and includes means for causing the charge data stored in said second memory means to be kept uncleared in spite of the operation of said fourth switching means when said second data processing means is in said second operative state.

2. A postal charge processing system according to claim 1, wherein said meter stamp issuing means has a flag memory coupled to said second data processing means for determining the operative state of said second data processing means, and said first data processing means includes means for supplying a clear key lock signal to said second data processing means when it is detected that the transfer of the charge data from said second calculating means to said second memory means is ended, thus causing said second data processing means to write a first predetermined data in said flag memory.

3. A postal charge processing system according to claim 2, wherein said first data processing means includes means for interrupting said clear key lock signal in response to weight data which is generated from said weight measuring means and includes means for indicating removal of the postal article from said measuring means.

4. A postal charge processing system according to any one of claims 1, 2 or 3, wherein said second switching means includes a lamp which is turned on in response to the operation of said second switching means and which is turned off in response to the completion of transfer of charge data from said charge calculating means to said second memory means.

5. A postal charge processing system according to claim 1, wherein said first and second switching means comprises a keyboard of said charge calculating means.

6. A postal charge processing system according to claim 1 or claim 5, wherein said third through fifth switching means comprises a keyboard of said meter stamp issuing means.

* * * * *